United States Patent
Röttger

(10) Patent No.: US 6,167,908 B1
(45) Date of Patent: Jan. 2, 2001

(54) VALVE ASSEMBLY FOR AN APPARATUS UNDER PRESSURE

(75) Inventor: Konstantin Röttger, Arnsberg (DE)

(73) Assignee: VTI Ventil Technik GmbH, Menden (DE)

(*) Notice: Under 35 U.S.C. 154(b), the term of this patent shall be extended for 0 days.

(21) Appl. No.: 09/552,434

(22) Filed: Apr. 18, 2000

(30) Foreign Application Priority Data

Apr. 19, 1999 (DE) .............................. 199 17 431

(51) Int. Cl.[7] ........................................ F16K 1/30
(52) U.S. Cl. .............................. 137/614.17; 137/614.2; 141/21
(58) Field of Search .............. 137/614.16, 613, 137/614.17, 614.19, 614.2, 522, 523, 454.5; 141/18, 21, 349

(56) References Cited

U.S. PATENT DOCUMENTS 3,589,397 * 6/1971 Wagner .......................... 137/614.2
4,210,168 * 7/1980 Yonezawa ................... 137/614.2 X
5,067,520 * 11/1991 Kremer et al. ................. 137/614.2

FOREIGN PATENT DOCUMENTS 34 41 348 A1 5/1986 (DE) .
197 09 096 A1 10/1998 (DE) .
0 458 253 B2 5/1991 (EP) .

* cited by examiner

Primary Examiner—Kevin Lee
(74) Attorney, Agent, or Firm—Henry M. Feiereisen

(57) ABSTRACT

A valve assembly for an apparatus under pressure includes a valve casing including a connecting pipe for attachment to an apparatus under pressure, and a discharge pipe, with the connecting pipe and the discharge pipe being connected by a fluid-carrying pathway. Integrated in the valve casing are a shut-off valve for regulating a flow of fluid through the fluid pathway, and a control valve which includes a spring-loaded valve body having a fluid duct forming part of the fluid pathway. The valve body has one end accommodating a first sealing element movable by the valve body against a valve seat for sealing the fluid passageway and thereby separate an inlet pressure zone from an outlet pressure zone, and another end accommodating a second sealing element movable by the valve body against a seal seat. The second sealing element rests against the seal seat to block the fluid pathway in the outlet pressure zone, when a residual minimum pressure in the apparatus under pressure falls below a predetermined level, thereby implementing a residual gas pressure lock.

3 Claims, 1 Drawing Sheet

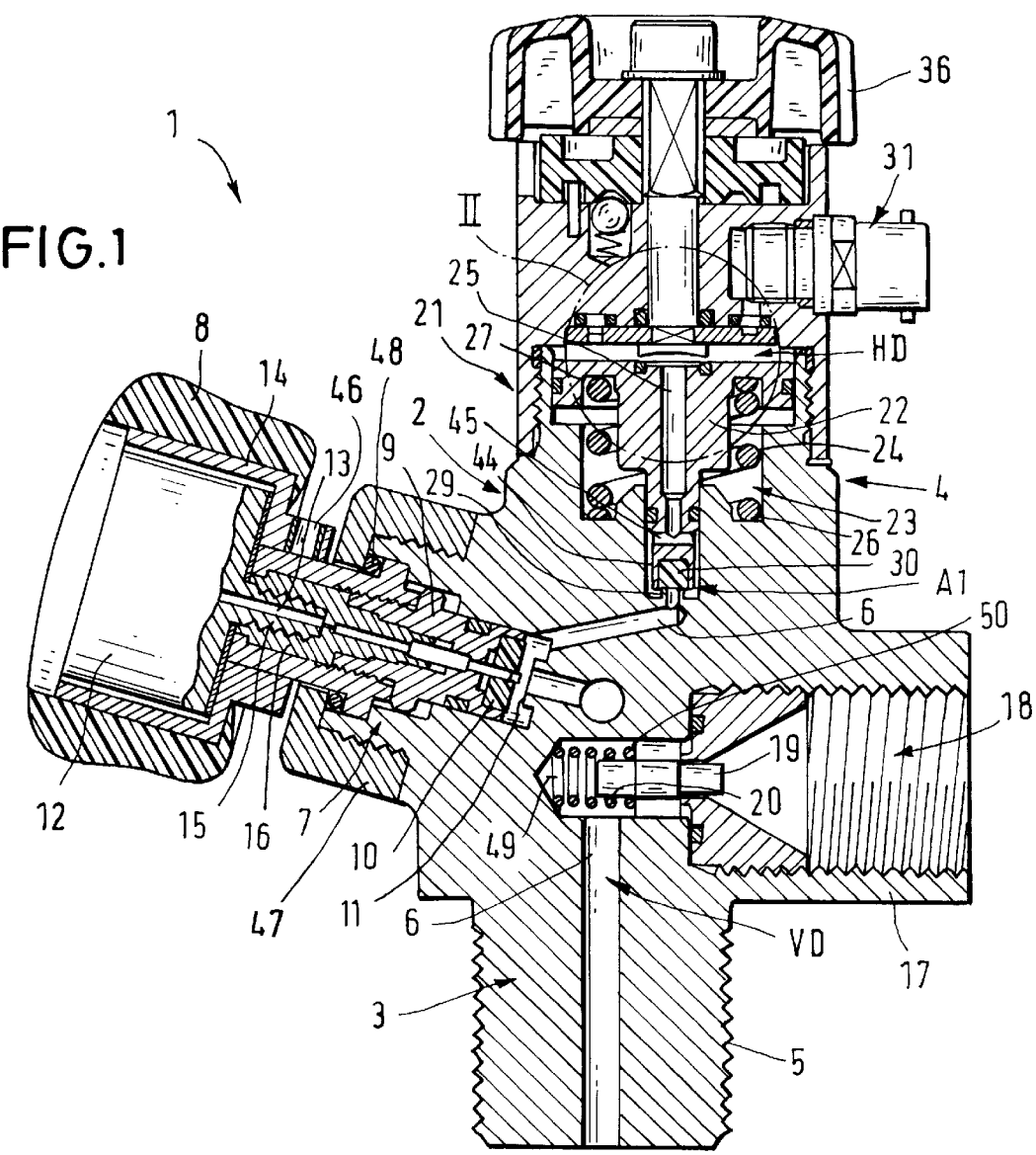

VALVE ASSEMBLY FOR AN APPARATUS UNDER PRESSURE

CROSS-REFERENCES TO RELATED APPLICATIONS

This application claims the priority of German Patent Application, Serial No. 199 17 431.8, filed Apr. 19, 1999, the subject matter of which is incorporated herein by reference.

BACKGROUND OF THE INVENTION

The present invention relates to a valve assembly for an apparatus under pressure, such as a vessel under pressure.

Pressure vessels, in particular gas bottles under high pressure, are used for receiving and delivery of various gases. The gases are contained in the pressure vessels either in a gaseous state under high pressure, or, for example in case of carbon dioxide, in liquid form under pressure. Other gases, e.g. acetylene, are contained under pressure in the vessel and dissolved in a carrier medium such as acetone to prevent a danger of explosion.

A typical construction of a conventional valve assembly includes a valve casing which has a connecting pipe for attachment to a pressure vessel, and a discharge pipe, with the connecting pipe and the discharge pipe being connected by a fluid-carrying pathway. Integrated in the valve casing are a shut-off valve for regulating a flow of fluid through the fluid pathway, and a control valve which includes a spring-loaded valve body having a fluid duct forming part of the fluid pathway. At its side proximate to the inlet pressure zone, the valve body includes a sealing element which is movable by the valve body against a valve seat for sealing the fluid pathway and thereby separate the inlet pressure zone from the outlet pressure zone.

Valve assemblies with pressure regulators are used for setting and/or regulating an outlet pressure with respect to the higher inlet pressure prevalent in the pressure vessel. A valve assembly of this type is disclosed, e.g., in the German Pat. No. DE 34 41 348 A1, and includes a pressure reducing valve, integrated in the valve casing, and a pressure regulating valve acted upon by a preset spring tension of a control spring. The pressure regulating valve reduces the static pressure on the outlet side (outlet pressure zone). As long as a pressure fluid is able to flow through the valve, the spring tension keeps the valve open and the valve body is lifted, i.e. away from the confronting valve seat. When the pressure builds up in the outlet pressure zone, the valve body is moved against the valve seat and the valve closes, as a consequence of the pressure buildup in conjunction with the effective surfaces of the valve body and the control spring. A modification of the preset spring tension allows an adjustment of the maximum pressure in the outlet pressure zone.

On many occasions, pressure vessels contain special gases, which, for safety concerns or due to their particular use, e.g., as clean gases in the technical industry, as medical gases or as immersion gases, should not be mixed with other gases or air. For that reason, pressure vessels are equipped with valve assemblies with integrated residual pressure valves. Such a valve assembly is described, e.g., in European Pat. No. EP 0 458 253 B1 or German Pat. No. 197 09 096 A1. The residual pressure valve is configured as a check valve which clears its valve seat and opens when the interior pressure exceeds the preset residual pressure. When the interior pressure drops below the preset residual pressure, a spring tension acts on the check valve to close the valve seat. Thus, the residual pressure valve prevents a complete pressure decrease in the pressure vessel when the discharge valve is open, as soon as the internal pressure of the gas drops below a preset minimum pressure. In this manner, there is no need to evacuate or flush the pressure vessel each time a new charge is introduced. Moreover, the residual pressure valve prevents ingress of foreign substances from outside.

Although conventional valve assemblies have shown their usefulness, they are still too bulky and complex in structure.

SUMMARY OF THE INVENTION

It is thus an object of the present invention to provide an improved valve assembly, obviating the afore-stated drawbacks.

In particular, it is an object of the present invention to provide an improved valve assembly with integrated residual gas pressure lock, which is compact and simple in structure while yet reliable in operation.

These objects, and others which will become apparent hereinafter, are attained in accordance with the present invention by providing a valve casing including a connecting pipe for attachment to an apparatus under pressure, and a discharge pipe, with the connecting pipe and the discharge pipe being connected by a fluid pathway; a shut-off valve for regulating a flow of fluid through the fluid pathway; and a control valve including a spring-loaded valve body which includes a fluid duct forming part of the fluid pathway, with the valve body having one end accommodating a first sealing element movable by the valve body against a valve seat for sealing the fluid pathway and thereby separate an inlet pressure zone from an outlet pressure zone, and another end accommodating a second sealing element movable by the valve body against a seal seat, wherein the second sealing element rests against the seal seat to block the fluid pathway in the outlet pressure zone, when a residual pressure in the apparatus under pressure drops below a predetermined level.

Thus, in accordance with the present invention, the valve body of the control valve has in addition to the sealing element in the inlet pressure zone, a further sealing element in the outlet pressure zone for bearing upon the confronting seal seat, when the residual pressure in the pressure vessel drops below a predetermined level.

The residual pressure can be defined by constructive means. It is dependent on the spring force of the control spring and its spring characteristic as well as on the distance between the valve body and the seal seat. It is however also possible to so configure the valve assembly that the residual pressure is adjustable.

In the valve assembly according to the present invention, the functions of the control valve and the residual pressure valve are combined in a united design, and assumed by a valve body. Response or closing of the residual pressure valve can be implemented according to the present invention by exploiting the deflection of the control spring that acts on the valve body. As soon as the inlet pressure drops below the outlet pressure, the control spring of the control valve relaxes and shifts the valve body in translational motion, with the second sealing element moving against the confronting seal seat to seal the inlet pressure zone against the atmosphere. Thus, a valve assembly with integrated pressure regulating valve in accordance with the present invention realizes a residual gas pressure lock in a simple manner, without need for additional components. The residual gas pressure lock prevents a full emptying of the pressure vessel via the discharge pipe, thereby ensuring that the pressure in the pressure vessel is always higher than the atmospheric pressure, and thereby prevent a gas exchange with the ambient atmosphere. Also, ingress of air humidity, leading to corrosions in the pressure vessel, are averted to ensure the purity of pressure fluid contained in the pressure vessel. Complex steps for evacuating the pressure vessel before recharging can now be omitted.

Other advantages of a valve assembly according to the present invention include the absence of additional bores for receiving a separate residual pressure valve, thus facilitating the manufacture, and the easier installation of the individual components as well as easier maintenance.

There are many ways of configuring the control spring, e.g. by various elastic elements, such as a pneumatic spring. Also the valve body may be configured in various manner, e.g. as piston or as membrane. According to one embodiment of the present invention, the valve body is configured as a stepped piston which is guided in a bore of the valve casing and acted upon by a helical compression spring. This configuration is reliable in operation, without encountering vibrations, and is easy to adjust. However, other embodiments which generally follow the concepts outlined here are considered to be covered by this disclosure.

There are also many ways to configure the second sealing element. One example includes a sealing ply of elastomer which is vulcanized onto the valve body. According to one embodiment of the present invention, the second sealing element is configured as a O-ring which is embedded in an annular groove of the valve body and circumscribes the fluid duct, for cooperation with an annular surface bead formed on the valve casing and serving as the seal seat. Although this construction is easy to manufacture and to install, as it requires only an O-ring and an annular surface bead in order to realize the residual gas pressure lock, other embodiments which generally follow the concepts outlined here are considered to be covered by this disclosure.

BRIEF DESCRIPTION OF THE DRAWING

The above and other objects, features and advantages of the present invention will be more readily apparent upon reading the following description of a preferred exemplified embodiment of the invention with reference to the accompanying drawing, in which:

FIG. 1 is a vertical section of a valve assembly according to the present invention; and FIG. 2 is a sectional, cutaway view of a detail marked II in FIG. 1 of the valve assembly.

DETAILED DESCRIPTION OF PREFERRED EMBODIMENTS

Throughout all the Figures, same or corresponding elements are generally indicated by same reference numerals.

Turning now to the drawing, and in particular to FIG. 1, there is shown a vertical section of a valve assembly according to the present invention, generally designated by reference numeral 1 and having a multi-part valve casing 2 which includes a connecting piece 5 for fluidtight attachment of the valve assembly 1 to an apparatus under pressure, such as a pressure vessel, through engagement of a threaded section 5 with a complementary threaded bore of the pressure vessel, and a discharge pipe 4. A fluid-carrying pathway 6, comprised of several passages in the form of longitudinal bores, transverse bores and oblique bores, fluidly connects an inlet pressure zone VD with an outlet pressure zone HD.

Integrated in the valve casing 2 is a shut-off valve, generally designated by reference numeral 7 which is operated by a handwheel 8. The shut-off valve 7 includes a shut-off element 9 having a handwheel-distal end receiving a seal insert 10, and an upper valve stem 16 which is supported in the valve casing 2 and fixedly secured to the handwheel 8 via a screw (not shown) which is received in a radial bore 46 of the handwheel 8. A coupling nut 47 secures the shut-off valve 7 in place inside the valve casing 2 via incorporation of a sliding ring 48. The upper valve stem 16 is suitably connected, e.g. via a threaded connection, to the shut-off element 9 which is secured against rotation in the valve casing 2, so that a turning of the handwheel 8 is translated into a linear displacement of the shut-off element 9 which thus can be moved against or lifted off a confronting main valve seat 11, thereby blocking or clearing the fluid pathway 6.

The handwheel 8 accommodates a manometer 12 which is in fluid communication with the fluid pathway 6 via a capillary bore 13. Thus, the pressure in the inlet pressure zone VD of the valve assembly 1 can be shown in a display. The manometer 12 is fixed in the handwheel 8 and secured against rotation relative to the handwheel 8 when the handwheel 8 is turned, by disposing the manometer 12 in a manometer holder 14 which is threadably engaged via a threaded pin 15 in the upper valve stem 16 and secured therein against rotation.

The valve assembly 1 further includes a filling pipe 17, which accommodates a check valve 18, for charging the pressure vessel. The check valve 18 has a closing element 19 which is loaded by a spring 20 positioned in a transverse bore 49 that forms part of the fluid-carrying pathway 6 and extends between an inside wall surface of the valve casing 2 and a shoulder 50 of the closing element 19. In order to charge the pressure vessel, the closing element 19 of the check valve 18 is pushed open to allow injection of fluid into the pressure vessel via the lower portion of the fluid pathway 6 in the connecting piece 3. After conclusion of the filling procedure, the check valve 18 automatically closes again.

Integrated in the valve casing 2 is a control valve 21 which separates the inlet pressure zone VD and the outlet pressure zone HD of the valve assembly 1. The control valve 21 includes a valve body in the form of a stepped piston 22 which is guided in a stepped bore 23 and biased by a control spring 24, e.g. a helical compression spring. A fluid duct 25 extends centrally through the piston 22 and also forms part of the fluid pathway 6. One end of the control spring 24 is supported in the bore 23 in a pocket 26 of the valve casing 2 and the other end of the spring 24 is received in a pocket 27 of the piston 22.

The piston 22 has an inlet pressure zone facing end which receives a sealing element 30 and cooperates with a confronting valve seat 29. The sealing element 30 is displaceable in unison with the piston 22 relative to the valve seat 29. When the piston 22 with its sealing element 30 is moved against the valve seat 29, the spring tension applied by the control spring 24 is determinative for the pressure in the outlet pressure zone HD.

Gas can be withdrawn via an outlet port 31, whereby the outlet pressure and the respective flow rate is adjustable through connection of the outlet port 31 with the outlet pressure zone HD on the discharge side of the piston 22 via a groove 33 and a bore 34 which are formed in a selector disk holder 32, as shown in particular in FIG. 2. The selector disk holder 32 is rotatably supported in the valve casing 2 and is operated by a handwheel 36 which is movable into defined index positions. A selector disk 37 is positioned between the selector disk holder 32 and the valve casing 2 and secured against rotation with respect to the selector disk holder 32. The selector disk 37, also called flow rate selector disk, is provided with bores of different diameters to thereby permit control of the flow rate through the outlet port 31. The selector disk 37 also implements a closing of the outlet port 31 and is supported in the valve casing 2 by sliding rings 38 which have the dual function to seal the outlet pressure zone HD, on the one hand, and to provide a sliding bearing, on the other hand.

A residual gas pressure lock is implemented by means of the piston 22 of the control valve 21. The piston 22 accommodates at its selector disk facing side a sealing element 40 for interaction with a seal seat 41. When the pressure in the pressure vessel drops below a preset minimum pressure, the sealing element 40 blocks the fluid pathway 6 in the outlet pressure zone HD by impacting against the seal seat 41. The residual pressure is dependent on the spring force of the control spring 21 and its spring characteristic as well as on the distance between the piston 22 and the seal seat 41.

As shown in particular in FIG. 2, the sealing element 40 is formed by an O-ring which is embedded in an annular groove 42 and circumscribes the fluid duct 25. The seal seat 41 is configured in the valve casing 2 as an annular surface bead 43 underneath the selector disk holder 32.

When acted upon by pressure and when gas exits through the outlet port 31, an equilibrium of forces is established between the resultant forces, defined by the area A1 at the valve seat 29 and the inlet pressure, the area A2 at the seal seat 41 and the outlet pressure as well as by the force of the control spring 24. The piston 22 is lifted off the valve seat 29 for passage of gas which is conducted via an annular space 44 between a first step of the bore 23 and a first step of the piston 22, and via transverse bores 45 into the fluid duct 25 and ultimately to the outlet port 31. When interrupting the gas stream, e.g. via the selector disk 37, the equilibrium of forces shifts and the resultant force at area A2 and the outlet pressure governs. Thus, the piston 22 is moved against the valve seat 29 and sealed at the area A1 from the inlet pressure.

When the inlet pressure drops during discharge of gas below the outlet pressure resulting from the area ratios A1/A2, the inlet pressure and the spring force, the spring force of the control spring 24 governs. Thus, the control spring 24 relaxes and moves the piston 22 translationally upwards against the seal seat 41. In the context, the term "upward" will denote a direction toward those portions of the valve assembly which appear on top of FIG. 1. When the piston 22 rests with its sealing element 40 against the seat 41, the gas stream is interrupted, whereas the inlet pressure zone VD is sealed against the atmosphere. Thus, a residual gas pressure lock is realized at the discharge side of the valve piston 22 by means of the sealing element 40 and the seal seat 41. This ensures that the pressure vessel cannot be completely emptied via the outlet port 31. Purity of the gas in the pressure vessel is ensured and no evacuation of the pressure vessel is necessary for re-charging.

While the invention has been illustrated and described as embodied in a valve assembly for an apparatus under pressure, it is not intended to be limited to the details shown since various modifications and structural changes may be made without departing in any way from the spirit of the present invention.

What is claimed as new and desired to be protected by Letters Patent is set forth in the appended claims:

1. A valve assembly for an apparatus under pressure; comprising:

a valve casing including a connecting pipe for attachment to an apparatus under pressure, and a discharge pipe, said valve casing having formed therein a fluid pathway for connecting the connecting pipe with the discharge pipe;

a shut-off valve for regulating a flow of fluid through the fluid pathway; and a control valve having a spring-loaded valve body which includes a fluid duct forming part of the fluid pathway, said valve body having one end accommodating a first sealing element movable by the valve body against a valve seat for sealing the fluid pathway and thereby separate an inlet pressure zone from an outlet pressure zone, and another end accommodating a second sealing element movable by the valve body against a seal seat, said second sealing element resting against the seal seat to block the fluid pathway in the outlet pressure zone, when a residual pressure in the apparatus under pressure drops below a predetermined level.

2. The valve assembly of claim 1 wherein the valve casing has a bore, said valve body being configured as a stepped piston which is guided in the bore and acted upon by a helical compression spring.

3. The valve assembly of claim 1 wherein the valve body has an annular groove, said second sealing element being configured as a O-ring which is embedded in the annular groove and circumscribes the fluid duct, said valve casing including an annular surface bead forming the seal seat for interaction with the O-ring.

* * * * *